No. 751,961. PATENTED FEB. 9, 1904.
G. W. TRONE.
FARROWING HOUSE.
APPLICATION FILED SEPT. 16, 1903.
NO MODEL.
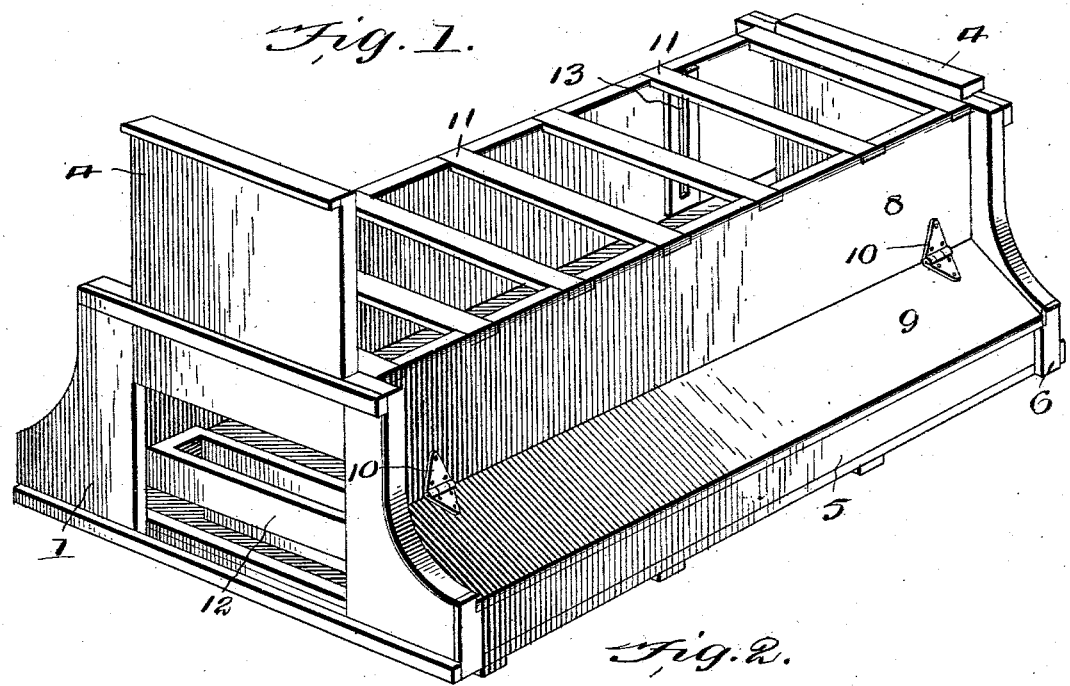
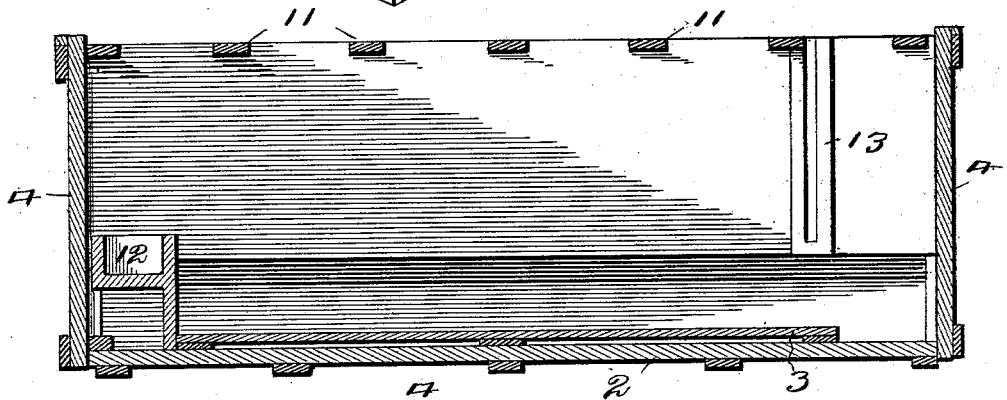
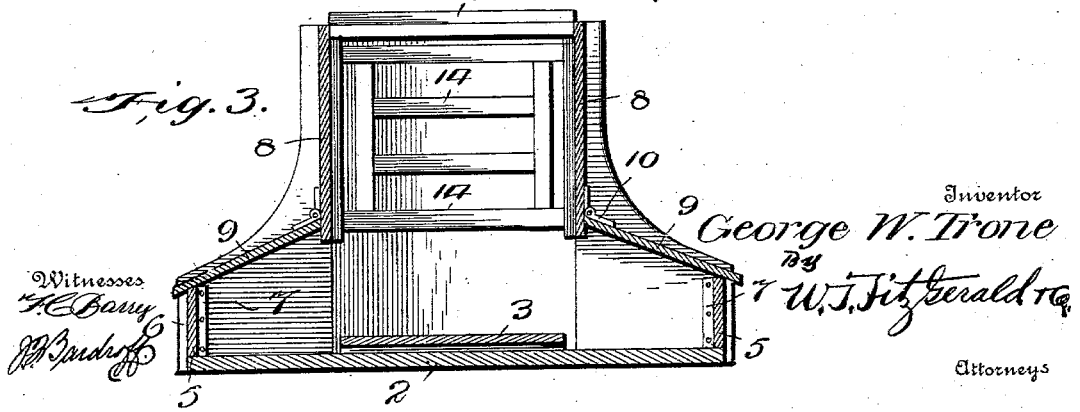
Inventor
George W. Trone
By W. J. Fitzgerald
Attorneys
Witnesses No. 751,961.

Patented February 9, 1904.

UNITED STATES PATENT OFFICE.

GEORGE W. TRONE, OF RUSHVILLE, ILLINOIS.

FARROWING-HOUSE.

SPECIFICATION forming part of Letters Patent No. 751,961, dated February 9, 1904.

Application filed September 16, 1903. Serial No. 173,475. (No model.)

*To all whom it may concern:*

Be it known that I, GEORGE W. TRONE, a citizen of the United States, residing at Rushville, in the county of Schuyler and State of Illinois, have invented certain new and useful Improvements in Farrowing-Houses; and I do hereby declare the following to be a full, clear, and exact description of the invention, such as will enable others skilled in the art to which it appertains to make and use the same.

My invention has relation to protecting pens or houses for live stock, and more particularly to a farrowing-house designed primarily for the protection of young swine; and it consists of certain novel features of construction and combination of parts, the preferred form whereof will be hereinafter clearly set forth, reference being had to the accompanying drawings, which are made a part of this application, and in which—

Figure 1 is a perspective view of my invention complete ready for use. Fig. 2 shows a longitudinal central section of Fig. 1, while Fig. 3 shows a transverse section of Fig. 1.

Numerals will for convenience be employed to refer to all the details of my invention and accessories deemed necessary to show a practical application thereof to use, and, referring to the numerals on the drawings, 1 indicates the end sections of my housing, which are erected in any preferred way upon the base member 2, a false floor or movable section thereof, 3, being also provided, as clearly shown in Figs. 2 and 3. The end walls are provided with an opening designed to receive the door or closure section 4, which is preferably arranged to move up and down in suitable guideways. I also provide the side walls 5, which extend upward from each edge of the base-section 2 and are removably secured in position as by means of the retaining-sections 6 and the cleats 7, whereby said side walls 5 may be bodily raised up out of the way when not desired. I also provide the upper side walls or sections 8, which reach from the top of the end walls down to a point a comparatively short distance above the floor-section, and while the side walls 5 and 8 are parallel with each other they occupy different relative positions, inasmuch as the side wall 8 is located a proper distance inward from the side walls 5, and in order that said side walls may be connected with each other for the purpose of protecting the inside of the housing from the inclemencies of the weather and also to inclose the young animals I provide the inclined connecting-wall or door-section 9, which in this instance is connected to the side sections 8, as by the hinges 10 or the equivalent thereof. The side walls 8 are also connected at suitable intervals at their upper edges with the cross-bars 11, or a continuous roof may be located thereon, if preferred. I also locate within the main chamber provided by the side walls 8 the feeding-trough 12, which may be constructed in any preferred way and is rendered accessible by raising the closure or door 4, whereby the feed for the mother animal may be placed therein. In some instances I also provide the guideways 13 upon opposite sides of the side walls 8, adapted to receive the removable partition-wall 14, preferably formed of a plurality of cross-bars, as shown in Fig. 3.

It will be understood that the mother animal is to be located within the chamber formed by the side walls 8 and coöperating end sections, while the young swine will be left free to occupy the space upon each side of the central chamber, said space being covered by the inclined wall-sections or lid 9, as more clearly illustrated in Fig. 3. The mother animal is thus accommodated with sufficient room to freely move about, but ample space is also afforded for the young swine, thus enabling them to escape trampling or crushing when the mother lies down. The auxiliary floor-section 3 may be thus rendered easily accessible for the purpose of cleaning by raising either or both of the inclined wall-sections 9. The attendant will also be able to gain access to the interior practically without the knowledge of the mother, and may thus secure any of the young swine or give such attention to them as may be desirable.

My improved farrowing-house may thus be made at comparatively small cost and will be found to be reliably efficient in the performance of its office in securing the mother animal and at the same time affording free access to its interior, whereby proper attention may at all times be given to the young animals, as for the purpose of supplying them with any special food or treatment and, furthermore, insuring that they will have ample room free from danger of crushing or other injury.

If preferred, suitable runners may be placed beneath the base-section 2, whereby the house may readily be drawn over the ground from place to place.

While I have described the preferred combination and construction of parts deemed necessary in carrying out my invention, I wish to comprehend such substantial equivalents and substitutes as may be considered as falling fairly within the scope of my invention.

Believing that the advantages and manner of constructing my improved farrowing-house have thus been made clearly apparent, further description is deemed unnecessary.

What I claim as new, and desire to secure by Letters Patent, is—

The herein-described farrowing-house comprising a main central chamber and auxiliary chambers having a less upward extent than the main chamber, main wall-sections 8, inclined wall-sections 9 hinged to the main wall-sections 8 and affording a closure for said auxiliary sections, a feeding-trough 12 located at one end of said main chamber, a suitable door designed to give free access to said feeding-trough, a corresponding door-section at the opposite end of said main chamber adapted to give ingress or egress to said chamber, a removable partition-wall 14 adapted to enter guideways 13 upon opposite sides of the wall-sections 8 whereby the mother animal may be temporarily confined in one end of said main chamber while the floors thereof are being cleaned, all combined substantially as specified and for the purpose set forth.

In testimony whereof I affix my signature in presence of two witnesses.

GEORGE W. TRONE.

Witnesses:
   T. E. BOTTENBERG,
   W. H. DIETERICH.